(12) United States Patent
Li et al.

(10) Patent No.: US 11,954,507 B2
(45) Date of Patent: Apr. 9, 2024

(54) GUI COMPONENT RECOGNITION APPARATUS, METHOD AND PROGRAM

(71) Applicant: NIPPON TELEGRAPH AND TELEPHONE CORPORATION, Tokyo (JP)

(72) Inventors: Di Li, Musashino (JP); Haruhisa Nozue, Musashino (JP); Kazuaki Akashi, Musashino (JP); Kenichi Tayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/908,233

(22) PCT Filed: Mar. 2, 2020

(86) PCT No.: PCT/JP2020/008708
§ 371 (c)(1),
(2) Date: Aug. 30, 2022

(87) PCT Pub. No.: WO2021/176523
PCT Pub. Date: Sep. 10, 2021

(65) Prior Publication Data
US 2023/0153126 A1    May 18, 2023

(51) Int. Cl.
*G06F 9/451* (2018.01)
*G06F 3/04812* (2022.01)

(52) U.S. Cl.
CPC .......... *G06F 9/451* (2018.02); *G06F 3/04812* (2013.01)

(58) Field of Classification Search
CPC ..... G06F 9/451; G06F 3/04812; G06F 3/0481
See application file for complete search history.

(56) References Cited

U.S. PATENT DOCUMENTS

| | | | |
|---|---|---|---|
| 10,296,444 B1* | 5/2019 | Choudhary | G06F 11/3664 |
| 2005/0212768 A1* | 9/2005 | Toda | G06F 3/04812 |
| | | | 345/162 |
| 2011/0078636 A1* | 3/2011 | Jeon | G06F 3/0488 |
| | | | 715/859 |
| 2011/0214107 A1* | 9/2011 | Barmeir | G06F 11/3684 |
| | | | 717/125 |

(Continued)

FOREIGN PATENT DOCUMENTS

JP    2010102620 A    5/2010

*Primary Examiner* — Daniel W Parcher
(74) *Attorney, Agent, or Firm* — Harness, Dickey & Pierce, P.L.C.

(57) ABSTRACT

A GUI component in a screen is recognized without analyzing a program code of application software.

A screen recognition device includes a GUI component form/position determination unit 11 that extracts a GUI component included in a display screen of application software, from the display screen, and that determines the form and position of the GUI component, and a GUI component kind identification unit 12 and a GUI component operation identification unit 13 that determine the kind of the GUI component and an operation that can be performed to the GUI component, based on a change in a mouse cursor and a change in the GUI component when the mouse cursor is superimposed on the GUI component.

18 Claims, 4 Drawing Sheets

(56) References Cited

U.S. PATENT DOCUMENTS

| | | | |
|---|---|---|---|
| 2014/0365931 A1* | 12/2014 | Yoshimura | G06F 3/04892 715/767 |
| 2016/0019049 A1* | 1/2016 | Kakhandiki | G06F 8/658 717/168 |
| 2017/0001308 A1* | 1/2017 | Bataller | B25J 9/163 |

* cited by examiner

GUI COMPONENT RECOGNITION APPARATUS, METHOD AND PROGRAM

TECHNICAL FIELD

The present invention relates to a screen recognition device, a screen recognition method and a program.

BACKGROUND ART

There is a proposition for automatically generate a user operation scenario from a GUI program with no separate labor in a development process (for example, Patent Literature 1).

CITATION LIST

Patent Literature

Patent Literature 1: Japanese Patent Laid-Open No. 2010-102620

SUMMARY OF THE INVENTION

Technical Problem

For automating a work using an OSS (Operation Support System), it is necessary to extract the position and form of a GUI (Graphic User Interface) component on a screen of the OSS and the kind such as a character, a button and a text box, and to identify an operation that can be performed on the screen.

For this kind of extraction and identification, in the related art including the technology described in Patent Literature 1, it is necessary to analyze and determine a program code and an object in a terminal memory for a target application. Therefore, the extraction and the identification cannot be applied to an environment in which it is not possible to analyze the program code and the object in the terminal memory for the target application, for example, to the screen of the OSS in which an operator cannot see a source code.

The present invention has been made in view of the above circumstance, and an object thereof is to provide a screen recognition device, a screen recognition method and a program that make it possible to recognize the GUI component in the screen without analyzing the program code of application software, the object in the terminal memory for the target application, and the like.

Means for Solving the Problem

An aspect of the present invention includes: an extraction unit configured to extract a GUI component included in a display screen of application software, from the display screen; and a determination unit configured to determine a kind of the GUI component extracted by the extraction unit and an operation that can be performed to the GUI component, based on a change in a mouse cursor and a change in the GUI component when the mouse cursor is superimposed on the GUI component.

Effects of the Invention

According to an aspect of the present invention, it is possible to recognize the GUI component in the screen without analyzing the program code of application software, the object in the terminal memory for the target application, and the like.

DESCRIPTION OF EMBODIMENTS

An embodiment when the present invention is applied to a device that performs screen recognition will be described below.

[Configuration]

Figure 1:
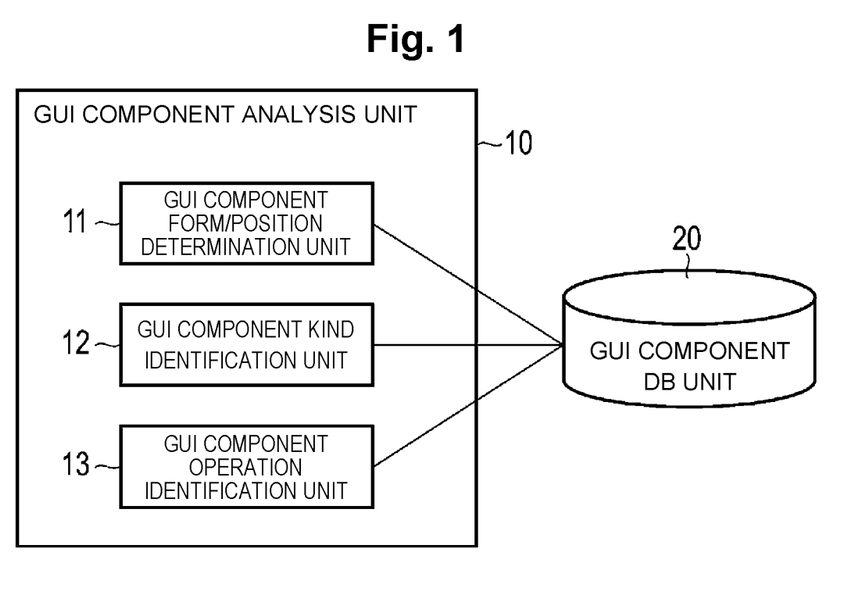
FIG. 1 is a block diagram showing a GUI component analysis unit and a GUI component database (DB) unit according to an embodiment of the present invention.

FIG. 1 is a block diagram showing the functional configuration of the device that performs screen recognition, and is a block diagram showing a GUI component analysis unit 10 and a GUI component database (DB) unit 20 in which many pieces of information about a GUI component that is a recognition target are recorded. The GUI component analysis unit 10 includes a GUI component form/position determination unit 11, a GUI component kind identification unit 12 and a GUI component operation identification unit 13. All results from sequential analysis processing by the units of the GUI component form/position determination unit 11, the GUI component kind identification unit 12 and the GUI component operation identification unit 13 are recorded in the GUI component DB unit 20.

The content shown in FIG. 1 shows, as a block diagram, the functional concept configuration of a software program (hereinafter referred to as "analysis software") that performs an analysis according to the embodiment, and the hardware configuration, which is the same as that of a general computer, includes a keyboard and a pointing device such as a mouse as an input unit, a monitor display to perform screen display as an output unit, a processor as a processing unit, various memories and storage devices, and others.

[Behavior]

Next, the behavior of the embodiment will be described.

Figure 2:
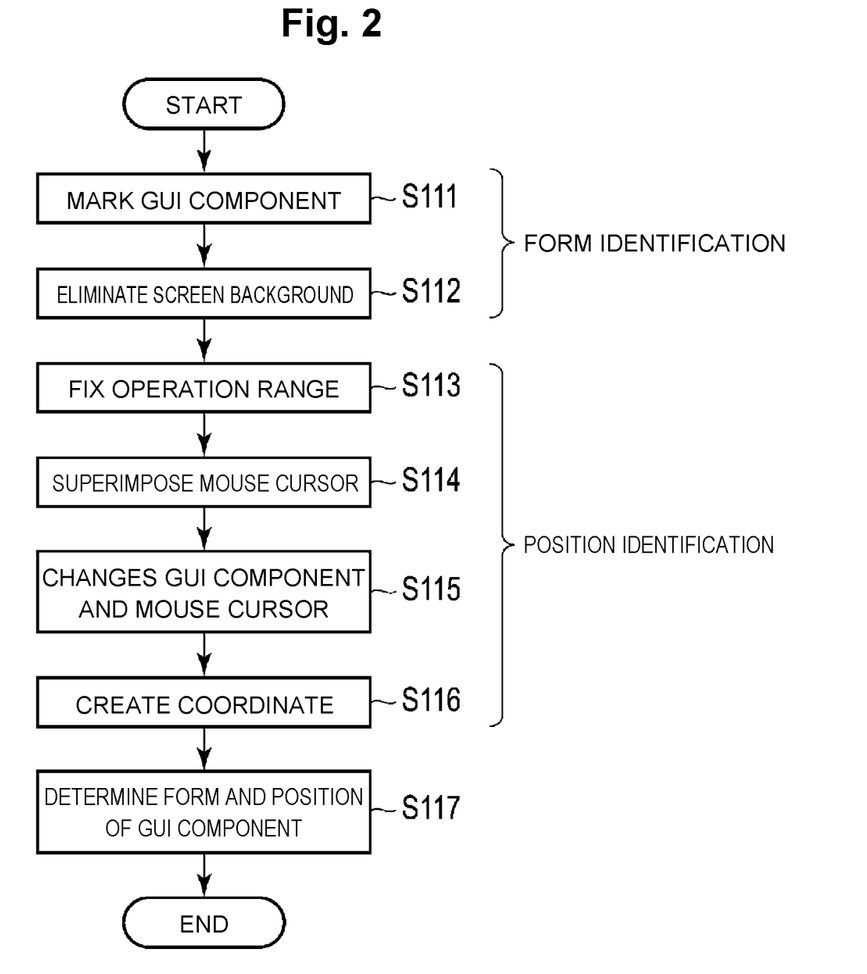
FIG. 2 is a flowchart showing processing contents for identifying the form and position of a GUI component in a screen according to the embodiment.

FIG. 2 is a flowchart showing processing contents when the GUI component form/position determination unit 11 identifies the form and position of the GUI component in a screen provided by application software, with the analysis software in the embodiment.

In the beginning of the process, the GUI component form/position determination unit 11 performs a marker process to the GUI component in the screen, by accepting a key operation such as a simultaneous operation of a "Ctrl (control)" key and an "A" key or a continuous operation of a "Tab" key through the keyboard (step S111).

A region range in which neither the display form of a mouse cursor nor the display form of the GUI component changes at the time when the marker process of the GUI component is performed and the mouse cursor is superimposed is regarded as a region that is a background other than the GUI component, and is eliminated from the target of the analysis process for the GUI component (step S112).

In other words, a range in which the display form of at least one of the mouse cursor and the GUI component changes at the time when the marker process of the GUI component is performed and the mouse cursor is superimposed is regarded as the range of the GUI component, and is adopted as a target of the analysis process.

Then, the identification process for the form of the GUI component ends, and next, the GUI component form/position determination unit 11 transitions to an identification process for the position range of the GUI component.

First, the GUI component form/position determination unit 11 executes a process for fixing the operation range of the GUI component in the screen, by accepting a combined operation of a "Home" key and an "End" key or a combined operation of a "PgUp (page up)" key and a "PgDn (page down)" key and the like through the keyboard (step S113).

Furthermore, the mouse cursor is superimposed on identified operations ranges of GUI components (mouse cursor over) sequentially and consecutively (step S114), and acquires changes in the states of the operation ranges of the GUI components and the mouse cursor itself are acquired at the time when the mouse cursor is superimposed in the screen of the application software (step S115).

Based on the change in each GUI component, the GUI component form/position determination unit 11 creates a coordinate range of the GUI component in the screen, and recognizes the form of the outline (step S116).

From the results, the GUI component form/position determination unit 11 comprehensively determines the form and position range of each GUI component in the screen, and records the determination result in the GUI component DB unit 20 (step S117). Then, the process in the GUI component form/position determination unit 11 ends.

As described above, the GUI component form/position determination unit 11 has the function to identify the form of the GUI component in steps S111 and S12 and the function to identify the position of the GUI component shown in steps S113 to S117.

Next, processes by the GUI component kind identification unit 12 and the GUI component operation identification unit 13 after the form and position of the GUI component are identified will be described with use of FIG. 3.

Figure 3:
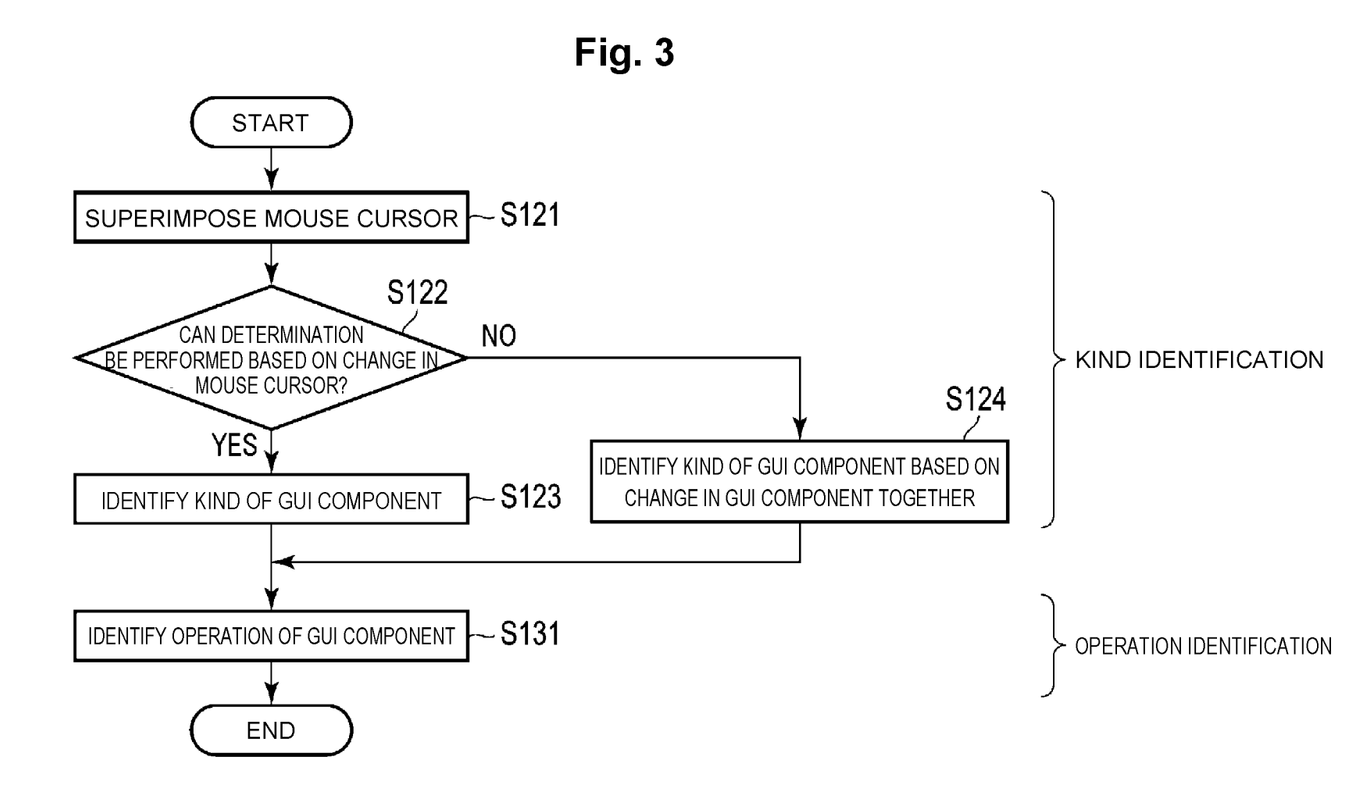
FIG. 3 is a flowchart showing processing contents for identifying the kind and operation of the GUI component in the screen according to the embodiment.

FIG. 3 is a flowchart showing a sequence of processing contents for identifying the kind and operation of one GUI component with the analysis software in the embodiment. First, based on the determination result about the form and position range of each GUI component that is recorded in the GUI component DB unit 20, the GUI component kind identification unit 12 superimpose the mouse cursor on the GUI component (mouse cursor over), and changes the display forms of the mouse cursor itself and the GUI component in the screen of the application software (step S121).

The GUI component kind identification unit 12 determines whether the kind of the GUI component can be identified based on only the change in the mouse cursor (step S122).

In the case where the GUI component kind identification unit 12 determines that the kind of the GUI component can be identified based on only the change in the mouse cursor (YES in step S122), the GUI component kind identification unit 12 identifies the kind of the GUI component (step S123).

In the case where the GUI component kind identification unit 12 determines that the kind of the GUI component can be identified based on only the change in the mouse cursor in step S122 (NO in step S122), the GUI component kind identification unit 12 identifies the kind of the GUI component based on both the change in the cursor and the change in the GUI component (step S124).

Next, the GUI component operation identification unit 13 identifies the operation corresponding to the GUI component based on the kind of the GUI component identified in step S123 or step S124 (step S131), and records the identified result in the GUI component DB unit 20. Then, the process in FIG. 3 ends.

The GUI component kind identification unit 12 and the GUI component operation identification unit 13 identify the kinds of all GUI components recorded in the GUI component DB unit 20 and the operations corresponding to the kinds, by repeatedly executing the process in FIG. 3 to the number of the recorded GUI components, and record the identified results in the GUI component DB unit 20.

Figure 4:
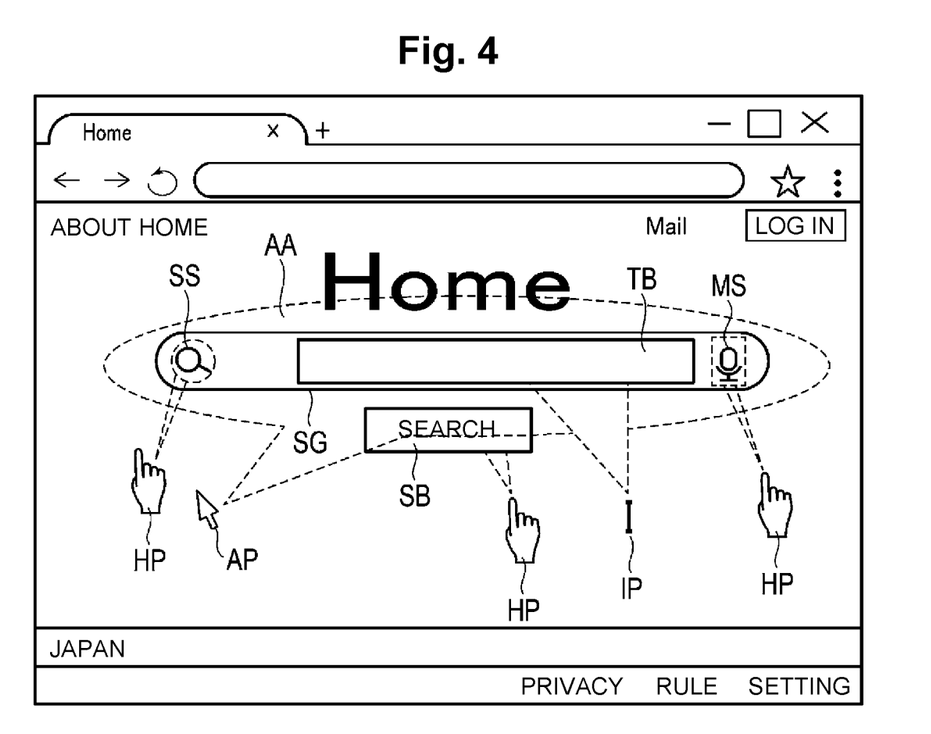
FIG. 4 is a diagram exemplifying a screen on which a home page at a website is displayed according to the embodiment.

FIG. 4 is a diagram exemplifying a screen on which a home page (Home) at a certain website is displayed by a web browser as an example of the application software. In the figure, a search guide portion SG for assisting a content search in the website is displayed at the center of the screen, and a search symbol SS for giving an instruction of the execution of the search, a text input box TB for inputting a search text and a microphone symbol MS for giving an instruction of the text input by voice are disposed in the search guide portion SG. Further, a search button SB for giving an instruction of the execution of the search is displayed on the lower side of the search guide portion SG.

As specific GUI components, the search symbol SS in a circular range, the text input box TB in a rectangular range, the microphone symbol MS in a rectangular range and the search button SB in a rectangular range are recognized differently from the screen background other than them.

In the whole of a peripheral region AA including the search guide portion SG, an arrow pointer AP is displayed as the mouse cursor. Meanwhile, when an instruction point at an arrow tip of the arrow pointer AP moves particularly to the search symbol SS, microphone symbol MS and search button SB recognized as GUI components and becomes the state of the mouse cursor over, the display of the mouse cursor changes from the arrow pointer AP to the hand pointer HP, and waits for the jump to respective preset link destinations by click operations in the GUI components.

Furthermore, when the instruction point at the arrow tip of the arrow pointer AP moves to the text input box TB and becomes the state of the mouse cursor over, the display of the mouse cursor changes from the arrow pointer AP to an I-beam pointer, and waits for the input of the text information into the text input box TB.

Here, the analysis of the screen based on the change in the mouse cursor, particularly, the analysis of the GUI component will be described afresh.

As described above, the symbol image of the mouse cursor that is displayed is determined by the setting of the property of the mouse cursor. The mouse cursor corresponding to the content to be operated is displayed depending on the kind of the GUI component at the point position. For example, the arrow pointer AP is displayed in the case of the normal mouse cursor, the I-beam pointer IP is displayed in the case of the input of a text, and the hand pointer HP is displayed in the case of the selection of a link.

Therefore, based on the characteristic of the change in the mouse cursor, it is possible to perform the drawing recognition relevant to the GUI component, from combinations of operations that are normally performed by a user and that do not influence a computer system and the like, as exemplified by combinations of the mouse cursor over and the key input operation for texts and the like.

Specific examples are shown below. Examples in the analysis of the screen at the website and the like are shown as follows.

The I-beam pointer IP corresponding to text input can be displayed at the time when the mouse cursor is input to an area to which a text can be input or an area to which a text can be copied.

The distinction between mere text data and a text link can be determined from the combination between a link selection cursor and an underline.

A mere character or figure can be determined from the simultaneous operation of the "Ctrl" key and the "A" key.

The entrance to an object region where a button, an icon or the like can be selected can be determined from the change in the symbol image between a normal mouse cursor for selection and a mouse cursor for objects and the display of a guide message.

The mouse cursor for the link selection has a characteristic of being not displayed when there is no link destination, and therefore can be used for the determination of an area for which the possibility of the link selection is low, as exemplified by a menu bar and a title bar.

In the case of the change from the normal arrow pointer AP to another mouse cursor, the function of an area where the arrow pointer AP just before the change is displayed can be determined from the display form of the arrow pointer AP.

A top range of a page can be grasped by the operation of the "Home" key or the "PgUp" key of the keyboard.

A bottom range of a page can be grasped by the operation of the "End" key or the "PgDn" key of the keyboard.

Therefore, since "some mouse cursors are displayed only in particular areas in the screen" and "some mouse cursors transition to particular operations", by using the change characteristic of the mouse cursor, it is possible to recognize the GUI component in the screen. Particularly, by considering not only the mouse cursor but also the change in the GUI component, it is possible to enhance the recognition accuracy.

Effect of Embodiment

As described above in detail, it is not necessary to analyze the program code of the application software, the object in the terminal memory for the target application, or the like, and therefore, it is possible to recognize the GUI component even in the environment in which the program code cannot be analyzed, and the like. Therefore, the embodiment can contribute to RPA (Robotic Process Automation) that is a business process automation technology, for example.

Further, in the embodiment, before the identification of the operation corresponding to the kind of the GUI component, the mouse cursor is sequentially superimposed on the GUI component in the screen, or the preset combined key operation is accepted. Then, the range that is around the GUI component and in which the display form does not change is removed as the background, and the remaining range of the GUI component is extracted. Thereby, it is possible to efficiently perform the identification work after that.

Furthermore, in the embodiment, in the case where the kind of the GUI component cannot be identified based on only the change in the mouse cursor when the mouse cursor is superimposed on the GUI component, the kind of the GUI component is identified based on the change in the mouse cursor and the change in the GUI component, and therefore it is possible to more efficiently identify the kind of the GUI component.

The device in the present invention can be realized also by a computer and a program, and the program can be recorded in a recording medium, or can be provided through a network.

In addition, the invention in the present application is not limited to the embodiment, and various modifications can be made in the practical phase without departing from the spirit of the invention. Further, inventions in various phases are included in the embodiment, and various inventions can be extracted by appropriately combining a plurality of disclosed constituent elements. For example, even when some constituent elements are removed from all constituent elements shown in the embodiment, a configuration in which the constituent elements are removed can be extracted as an invention, as long as the problem described in the section "Technical Problem" can be solved and the effect described in the section "Effects of the Invention" can be obtained.

REFERENCE SIGNS LIST

10 GUI component analysis unit
11 GUI component form/position determination unit
12 GUI component kind identification unit
13 GUI component operation identification unit
20 GUI component database (DB) unit
AA Search box periphery
AP Arrow pointer
HP Hand pointer
IP I-beam pointer
MS Microphone symbol
SB Search button
SG Search guide portion
SS Search symbol
TB Text input box

The invention claimed is:

1. A screen recognition device comprising:
a processor; and
a storage medium having computer program instructions stored thereon, when executed by the processor, perform to:
perform a marking process on a graphical user interface (GUI) component in an active display screen provided by an application software, wherein the marking process distinguishes a background of the display screen from the GUI component in the display screen of the application software;
extract the GUI component included in the display screen of application software from the display screen;
superimpose a mouse cursor on the GUI component based on at least one of a form and a position of the GUI component extracted;
identify a change in the displayed symbol image of the mouse cursor;
determine that a kind of the extracted GUI component cannot be identified based only on the change in the displayed symbol image of the mouse cursor;
in response to the determining, determine the kind of the GUI component extracted and an operation that can be performed to the GUI component, based on the change in the mouse cursor and a change in the GUI component at the same time the mouse cursor is superimposed on the GUI component; and moving the mouse cursor sequentially to each of the plurality of graphical user interfaces in the display screen based on the form and the position of each GUI component, wherein the mouse cursor is moved to and superimposed on each GUI component to determine the kind and the operation of the graphical user interface.

2. The screen recognition device according to claim 1, wherein the computer program instructions further perform to sequentially superimpose the mouse cursor on the GUI component in the display screen of the application software, removes a range that is around the GUI component and in which a display form does not change, as a background, and extracts a remaining range of the GUI component.

3. The screen recognition device according to claim 1, wherein the computer program instructions further perform to accept a preset combined key operation to the GUI component in the display screen of the application software, removes a range that is around the GUI component and in which a display form does not change, as a background, and extracts a remaining range of the GUI component.

4. A non-transitory computer-readable medium having computer-executable instructions that, upon execution of the instructions by a processor of a computer, cause the computer to function as the screen recognition device according to claim 1.

5. A screen recognition method comprising:
a marking step of marking a graphical user interface (GUI) component in an active display screen provided by an application software, wherein the marking step distinguishes a background of the display screen from the GUI component in the display screen of the application software;
an extraction step of extracting the GUI component included in the display screen provided by the application software from the display screen;
a superimpose step of superimposing the mouse cursor over the GUI component in the display screen based on at least one of a form and a position of the GUI component;
an identification step of identifying a change in a displayed symbol image of the mouse cursor;
a determination step of determining that a kind of the GUI component cannot be identified based only on the change in the displayed symbol image of the mouse cursor, wherein in response to determining, determining the kind of the GUI component extracted in the extraction step and an operation that can be performed to the GUI component, based on the change in the displayed symbol image of the mouse cursor and a change in the GUI component at a same time the mouse cursor is superimposed on the GUI component; and
moving the mouse cursor sequentially to each of the plurality of GUI components in the display screen based on the form and the position of each GUI component, wherein the mouse cursor is moved to and superimposed on each GUI component to determine the kind and the operation of the GUI component.

6. The method of claim 5 further comprising:
identifying a range of the graphical user interface component in the display screen, wherein the range includes an area of the display screen having the graphical user interface component;
superimposing the mouse cursor on the range of the graphical user interface component identified in the display screen;
acquiring changes in a state of the range of the graphical user interface component and the mouse cursor at the time the mouse cursor is superimposed on the range of the graphical user interface;
creating a coordinate range based on the changes acquired in the state of the range of the graphical user interface component identified at the same time the mouse cursor is superimposed;
identifying the form of the range of the graphical user interface component; and
determining the position of the graphical user interface based on the coordinate range.

7. The method of claim 5 further comprises:
recognizing the displayed symbol image of the mouse cursor at the same time the mouse cursor is superimposed on the GUI component;
determining a setting of a property of the mouse cursor for a specific symbol image that correspond to a content of the GUI component at the same time the mouse cursor is superimposed on the graphical user interface component; and
identifying the content of the GUI component based on the displayed symbol image recognized for the mouse cursor.

8. The method of claim 5, wherein the form of the GUI component includes one or more symbol images that corresponds to a content and/or operation of the GUI component.

9. A method for automatically recognizing a graphical user interface component in an active display screen, the method comprising:
having a display screen includes a plurality of graphical user interface components and a background provided by an application software, wherein the plurality of graphical user interface components incudes at least two graphical user interface components and the display screen is in active operation;
extracting a graphical user interface component of the plurality of graphical user interface components from the display screen provided by the application software;
identifying a first form and a position of the graphical user interface component extracted in the display screen;
superimposing a mouse cursor on the graphical user interface component in the display screen based on at least one of the first form and the position of the graphical user interface component in the display screen, wherein when the mouse cursor is superimposed on the graphical user interface component occurs at least one of the following occurs: a change in a display form of the mouse cursor and change in a display form of the graphical user interface component, wherein the display form of the mouse cursor includes a symbol image of the mouse cursor;
identifying a change in the display form of the mouse cursor;
determining that a kind of the graphical user interface component cannot be identified based on only the change in the display form of the mouse cursor;
in response to the determining, identifying the kind of the graphical user interface component along with an operation associated with the kind of the graphical user interface component in the display screen based on the change in the display form of the mouse cursor and the change in the display form the graphical user interface component; and
moving the mouse cursor sequentially to each of the plurality of graphical user interface components in the display screen based on the form and the position of each graphical user interface component, wherein the mouse cursor is moved to and superimposed on each graphical user interface component to determine the kind and the operation of the graphical user interface.

10. The method of claim 9 further comprising identifying the kind and the operation of the graphical user interface component in the display screen based on only the change in the display form of the mouse cursor when the kind of the graphical interface component can be determined based on only the change in the display form of the mouse cursor.

11. The method of claim 9 further comprising moving the mouse cursor sequentially to each of the plurality of graphical user interfaces in the display screen based on the first form and the position of the graphical user interface component, wherein the mouse cursor is moved to the graphical user interface component and superimposed on the graphical user interface component to determine the kind and the operation of the graphical user interface.

12. The method of claim 9, wherein the first form includes a shape and size of the graphical user interface component in the display screen.

13. The method of claim 9, wherein the determining the form and the position of the graphical user interface component comprises:
  performing a marker process to the graphical user interface component in the display screen to distinguish the graphical user interface component from a background in the display screen, wherein the marker process changes of the graphical user interface component; and
  extracting the graphical user interface component based of at least one of the change in the mouse cursor and the change in the graphical user interface component when the marker process is performed.

14. The method of claim 13, further comprising:
  identifying the background of the display screen when neither the display form of the mouse curser nor the display form of the graphical interface component changes at the same time when the marker process is performed and the mouse cursor is superimposed; and
  eliminating the background from the display screen to extract the graphical user interface component from the display screen.

15. The method of claim 9, wherein the first form is a shape and size of the graphical user interface component.

16. The method of claim 9, wherein the identifying the first form and the position of the graphical user interface comprises:
  identifying a range of the graphical user interface component in the display screen, wherein the range includes an area of the display screen having the graphical user interface;
  superimposing the mouse cursor on the range of the graphical user interface component identified in the display screen;
  acquiring changes in a state of the range of the graphical user interface component and the mouse cursor at the same time the mouse cursor is superimposed on the range of the graphical user interface;
  recognizing a size and shape of the of the range of the graphical user interface component; and
  determining the first form of the graphical user interface based on the size and shape of the range of the graphical user interface.

17. The method of claim 9, wherein the identifying the first form and the position of the graphical user interface comprises:
  identifying a range of the graphical user interface component in the display screen, wherein the range includes an area of the display screen having the graphical user interface;
  superimposing the mouse cursor on the range of the graphical user interface component identified in the display screen;
  acquiring changes in a state of the range of the graphical user interface component and the mouse cursor at the time the mouse cursor is superimposed on the range of the graphical user interface;
  creating a coordinate range based on the changes acquired in the state of the range of the graphical user interface component identified at the same time the mouse cursor is superimposed; and
  determining the position of the graphical user interface based on the coordinate range.

18. The method of claim 9, wherein the kind of the graphical user interface includes at least one of a character, a button, and a text box.

* * * * *